No. 740,456. PATENTED OCT. 6, 1903.
S. MOWER.
CULTIVATOR, LISTER, AND GRADER.
APPLICATION FILED OCT. 20, 1902.
NO MODEL.

WITNESSES:
K. M. Imboden,
M. L. Lange.

INVENTOR
Samuel Mower
By Higdon & Higdon
Attys

No. 740,456.

Patented October 6, 1903.

UNITED STATES PATENT OFFICE.

SAMUEL MOWER, OF SPRINGHILL, KANSAS.

CULTIVATOR, LISTER, AND GRADER.

SPECIFICATION forming part of Letters Patent No. 740,456, dated October 6, 1903.

Application filed October 20, 1902. Serial No. 128,043. (No model.)

*To all whom it may concern:*

Be it known that I, SAMUEL MOWER, a citizen of the United States, residing at Springhill, in the county of Johnson and State of Kansas, have invented new and useful Improvements in Propelled Disk Cultivators, of which the following is a specification.

My invention relates to cultivators or listers of the type in which concave disks are employed to act upon the soil.

My invention consists, mainly, in mounting disks upon a transverse revoluble shaft or shafts and providing means for revolving the disks around a central shaft, whereby a much greater efficiency or duty is obtained from the disks than from their use in the ordinary manner. The motive or actuating power may be applied to the main disk-shaft in various ways; but in the preferred form of my invention I attach the disks and their coöperating parts to the tender or "tank" of a traction-engine and actuate them through a chain passing over a sprocket-wheel fixed upon the crank-shaft (or other shaft) of the engine.

Figure 1:
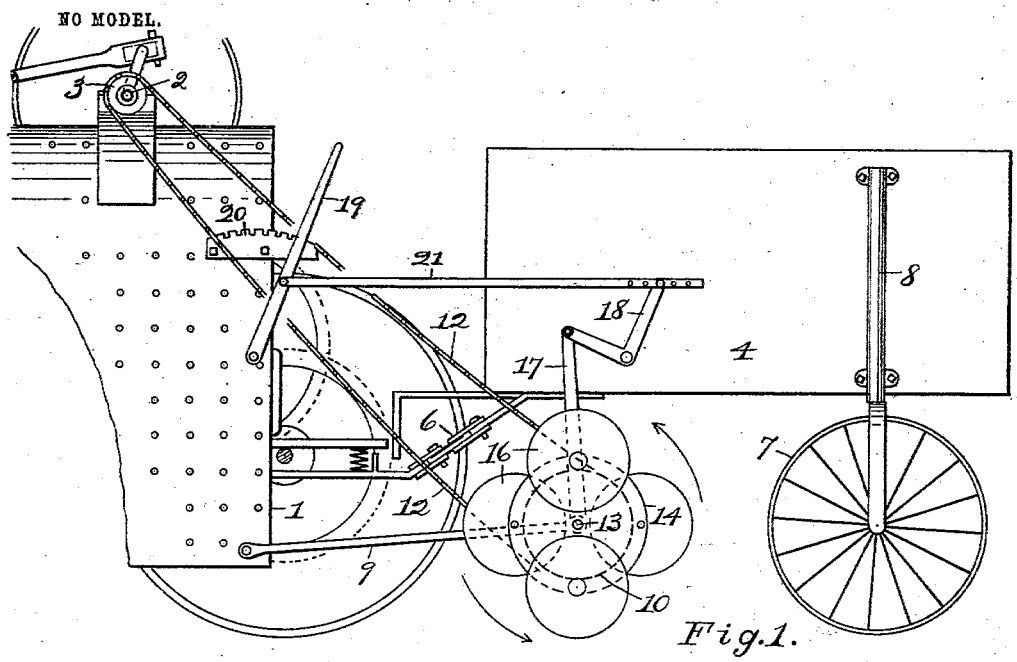
Figure 2:
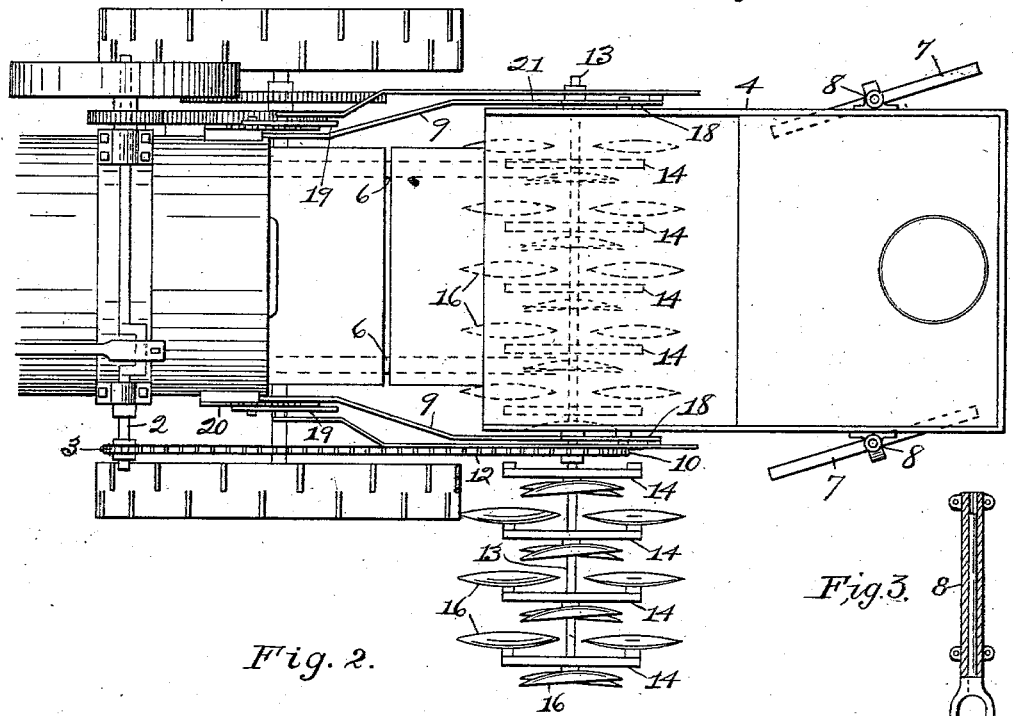
Figure 3:
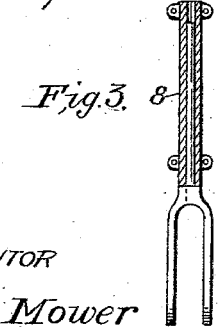

Referring now to the accompanying drawings, Figure 1 is a side elevation of a cultivator embodying my invention, showing the rear portion of a traction-engine employed for drawing and propelling the cultivator-disks. Fig. 2 is a plan view of the same in which some of the disks are indicated by dotted lines. Fig. 3 represents one of the caster-wheel forks with its bearing-sleeve in section.

Referring to Figs. 1 and 2, which represent a cultivator embodying my invention, 1 designates the fire-box of a traction-engine; 2, the crank-shaft; 3, a sprocket-wheel keyed upon said shaft, and 4 a tender or tank rigidly connected to the engine by two couplers 6 6. The tender is mounted on two caster-wheels 7 7. The forks of these wheels have upwardly-extending spindles which are mounted in sleeves or tubes 8 8, bolted to the sides of the tender, as shown. (See also Fig. 3.)

Secured pivotally to the respective sides of the fire-box of the engine near the rear and bottom thereof are two rearwardly-extending arms 9 9, the rear ends of which are provided with bearings through which passes a transverse rotatable shaft 13. Keyed on said shaft is a sprocket-wheel 10, which is connected by a chain 12 to the sprocket-wheel 3 on the engine-shaft.

A plurality of wheels 14 are keyed upon shaft 13 at suitable intervals from end to end thereof, and secured to each of said wheels are a plurality of disks 16. These disks may be mounted rotatably or non-rotatably, as preferred by the user. As shown in the drawings, each wheel 14 is provided with four disks, which are arranged alternately at opposite sides of the wheel. Every disk is inclined at an angle to its wheel—that is, the plane of every disk is inclined with respect to the planes of the wheels. The purpose of such inclination is well known in the art.

It will be observed by reference to Fig. 2 that all of the disks have their convex sides or backs toward their wheels, which causes the disks to face to right and left alternately.

The disk-shaft 13 is supported by two depending arms 17 17 at the respective sides of the tender, the upper ends of said arms being pivotally connected to a pair of angle-levers 18 18, fulcrumed on the sides of the tender.

Fulcrumed on the fire-box of the engine are two hand-levers 19 19, provided with segments 20 20 and connected adjustably to the angle-levers 18 by rods or bars 21 21. The height of the disks 16 above the ground and the depth to which they may be forced into the ground in operation are adjusted by adjusting the hand-levers 19 forward or back. The braces or arms 9 serve to prevent forward or backward oscillation of the disk-shaft 13 and maintain the tension of the chain 12.

The disks 16 should be revolved in the direction of the arrow. They may be revolved while the engine as a whole is at rest (the engine proper being in action) by opening the usual clutch (not shown) with which all traction-engines are provided for disengaging the engine from the running-gears. The wheels 7 being of the caster type permit the tender to readily follow the engine when making turns.

Having now fully described my invention, what I claim as new, and desire to secure by Letters Patent of the United States, is—

1. A cultivator comprising a vehicle, a transverse shaft carried thereunder, wheels secured upon said shaft, and disks secured to said wheels, substantially as described.

2. A cultivator comprising a vehicle, angle-levers fulcrumed on the sides thereof, arms depending from said levers, a transverse shaft supported by said arms, means for adjusting said levers, wheels secured upon said shaft, and disks secured to said wheels, substantially as described.

3. A cultivator comprising a vehicle, a transverse shaft carried thereunder, wheels secured upon said shaft, and a plurality of disks secured to each of said wheels, said disks being arranged at opposite sides alternately of each wheel, and facing alternately in opposite directions, substantially as described.

4. A cultivator comprising a vehicle, a transverse shaft carried thereunder, wheels secured upon said shaft, and a plurality of disks secured to each of said wheels, said disks being set obliquely with respect to said wheels, substantially as described.

5. The combination with a traction-engine and its tender of a transverse shaft carried under the tender, wheels secured upon said shaft, a sprocket on said shaft, disks secured to said wheels, a sprocket on the crank-shaft of the engine, and a chain connecting said sprockets, substantially as described.

6. The combination with a traction-engine and its tender, of a pair of rearwardly-extending arms connected to the fire-box, a transverse shaft connected rotatably to said arms, an angle-lever mounted on each side of the tender, arms depending from said angle-levers and supporting said shaft, cultivating devices carried revolubly by said shaft, hand-levers mounted on a portion of the engine, and rods connecting the hand-levers to said respective angle-levers, substantially as described.

7. The combination with a traction-engine and its tender, of a pair of rearwardly-extending arms connected to the fire-box, a transverse shaft connected rotatably to said arms, an angle-lever mounted on each side of the tender, arms depending from said angle-levers and supporting said shaft, spaced wheels secured non-rotatably on said shaft, disks mounted on said wheels, hand-levers mounted on a portion of the engine, and rods connecting the hand-levers to said respective angle-levers, substantially as described.

8. The combination with a traction-engine and its tender, of a pair of rearwardly-extending arms connected to the fire-box, a transverse shaft connected rotatably to said arms, wheels rigidly secured on said shaft, a plurality of disks mounted on each wheel, and means connected to the tender for raising and lowering said shaft, substantially as described.

9. The combination, with a traction-engine, of a sprocket on the crank-shaft of the engine, a transverse rotatable shaft drawn by the engine, cultivating devices carried revolubly by said shaft, a sprocket-wheel rigidly secured on said shaft, and a chain connecting said sprocket to the aforesaid sprocket; substantially as described.

In testimony whereof I affix my signature in the presence of two witnesses.

SAMUEL MOWER.

Witnesses:
M. L. LANGE,
K. M. IMBODEN.